US010404858B1

(12) United States Patent
Hoelzle et al.

(10) Patent No.: US 10,404,858 B1
(45) Date of Patent: Sep. 3, 2019

(54) SHORT MESSAGE SERVICE (SMS) WITH GEOGRAPHIC DATA FOR USER EQUIPMENT (UE)

(71) Applicant: Sprint Communications Company L.P., Overland Park, KS (US)

(72) Inventors: Sean Patrick Hoelzle, Collegeville, PA (US); Jing Qu, Sterling, VA (US); Patrick David Wilson, Denver, CO (US); Sanjay Kumar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/178,103

(22) Filed: Nov. 1, 2018

(51) Int. Cl.
*H04W 4/02* (2018.01)
*H04W 4/14* (2009.01)
*H04M 3/51* (2006.01)
*H04W 88/18* (2009.01)
*H04W 4/90* (2018.01)
*H04W 80/10* (2009.01)
*H04L 29/06* (2006.01)
*H04W 4/029* (2018.01)

(52) U.S. Cl.
CPC ....... *H04M 3/5116* (2013.01); *H04L 65/1006* (2013.01); *H04L 65/1016* (2013.01); *H04W 4/025* (2013.01); *H04W 4/029* (2018.02); *H04W 4/14* (2013.01); *H04W 4/90* (2018.02); *H04W 80/10* (2013.01); *H04W 88/184* (2013.01)

(58) Field of Classification Search
CPC ......... H04W 4/90; H04W 4/02; H04W 4/023; H04W 4/14; H04W 4/025; H04W 36/0022; H04W 48/18; H04W 76/15
See application file for complete search history.

(56) References Cited

U.S. PATENT DOCUMENTS

| | | |
|---|---|---|
| 5,937,355 A | 8/1999 | Joong et al. |
| 8,185,087 B2 | 5/2012 | Mitchell, Jr. et al. |
| 8,774,752 B1 | 7/2014 | Akcasu et al. |
| 9,094,811 B1 | 7/2015 | Rosen |
| 9,408,046 B2 | 8/2016 | Morin et al. |
| 2009/0233631 A1 | 9/2009 | Butler, Sr. et al. |
| 2010/0261448 A1 | 10/2010 | Peters |
| 2011/0009086 A1 | 1/2011 | Poremba et al. |
| 2012/0149324 A1* | 6/2012 | Daly ................ H04W 4/90 455/404.1 |
| 2013/0203373 A1 | 8/2013 | Edge |
| 2013/0303107 A1* | 11/2013 | Mitchell, Jr. .......... H04W 4/90 455/404.2 |

* cited by examiner

*Primary Examiner* — Kwasi Karikari

(57) ABSTRACT

A Short Message Service Center (SMSC) receives a Session Initiation Protocol (SIP) message transferred User Equipment (UE). The SIP message has a Private Access Network Information (PANI) header with geographic data for the UE and also has a Short Message Service (SMS) message from the UE. The SMSC determines when a destination code from the SMS message indicates an emergency SMS message. When the emergency SMS message is indicated, the SMSC transfers an emergency Short Message Peer-to-Peer (SMPP) message for delivery to a Public Safety Answering Point (PSAP) gateway. The emergency SMPP message has the geographic data for the UE and also has the emergency SMS message. The PSAP gateway selects a PSAP for the UE based on the geographic data in the SMPP message and transfers the emergency SMS message to the selected PSAP.

18 Claims, 6 Drawing Sheets

SHORT MESSAGE SERVICE (SMS) WITH GEOGRAPHIC DATA FOR USER EQUIPMENT (UE)

TECHNICAL BACKGROUND

Wireless data networks serve wireless telephones with mobile data services like internet access, voice calling, and Short Message Service (SMS). The wireless data networks have wireless access points that exchange user data over the air with the wireless telephones. The wireless telephones are usually mobile and access the internet, make calls, and send messages from various geographic locations. Tracking the location of an individual wireless phone is important during emergencies and other situations. The geographic location of the wireless access point which currently serves the wireless phone is often used to estimate the location of the wireless phone.

To send an SMS message, the wireless phone first establishes a bearer connection over a wireless data network to an Internet Multimedia Subsystem (IMS). The wireless phone transfers the SMS message to the IMS in a Session Initiation Protocol (SIP) message. The SIP message has a mark that indicates the internal SMS message. The SIP message also has a Private Access Network Information header that contains the identity of the wireless access point which currently serves the wireless phone. The IMS detects the presence of the SMS message and forwards the SIP message to an SMS Center (SMSC). The SMSC extracts the SMS message from the SIP message, and if the SMS message is not an emergency message, the SMSC authorizes the wireless phone for the SMS and transfers the SMS message toward the destination. To transfer the SMS message, the SMSC generates a Short Message Peer-to-Peer (SMPP) message and transfers the SMPP message containing the SMS message to an SMPP gateway. The SMPP gateway delivers the SMS message to the destination—often over an additional SMPP gateway, IMS, and wireless data network.

If the SMS message is an emergency message, the SMSC skips authorization and transfers the emergency SMS message in an SMPP message to a Public Safety Answering Point (PSAP) gateway—which is a special type of SMPP gateway. The PSAP gateway receives the SMPP message having the emergency SMS message and interacts with a network location platform that locates the wireless telephone for the PSAP gateway. The PSAP gateway then selects a PSAP based on the location of the wireless phone. The PSAP gateway then transfers the emergency SMS message to the selected PSAP. The selected PSAP interacts with a location server to locate the wireless phone that transferred the emergency SMS message. The selected PSAP then directs emergency personnel to the location of the wireless phone.

Unfortunately, the PSAP gateway first interacts with the network location platform to locate the wireless telephone before connecting to the PSAP. Moreover, some wireless telephones may not properly support location services from the network location platform.

TECHNICAL OVERVIEW

A Short Message Service Center (SMSC) receives a Session Initiation Protocol (SIP) message transferred User Equipment (UE). The SIP message has a Private Access Network Information (PANI) header with geographic data for the UE and also has a Short Message Service (SMS) message from the UE. The SMSC determines when a destination code from the SMS message indicates an emergency SMS message. When the emergency SMS message is indicated, the SMSC transfers an emergency Short Message Peer-to-Peer (SMPP) message for delivery to a Public Safety Answering Point (PSAP) gateway. The emergency SMPP message has the geographic data for the UE and also has the emergency SMS message. The PSAP gateway selects a PSAP for the UE based on the geographic data in the SMPP message and transfers the emergency SMS message to the selected PSAP.

DETAILED DESCRIPTION

Figure 1:
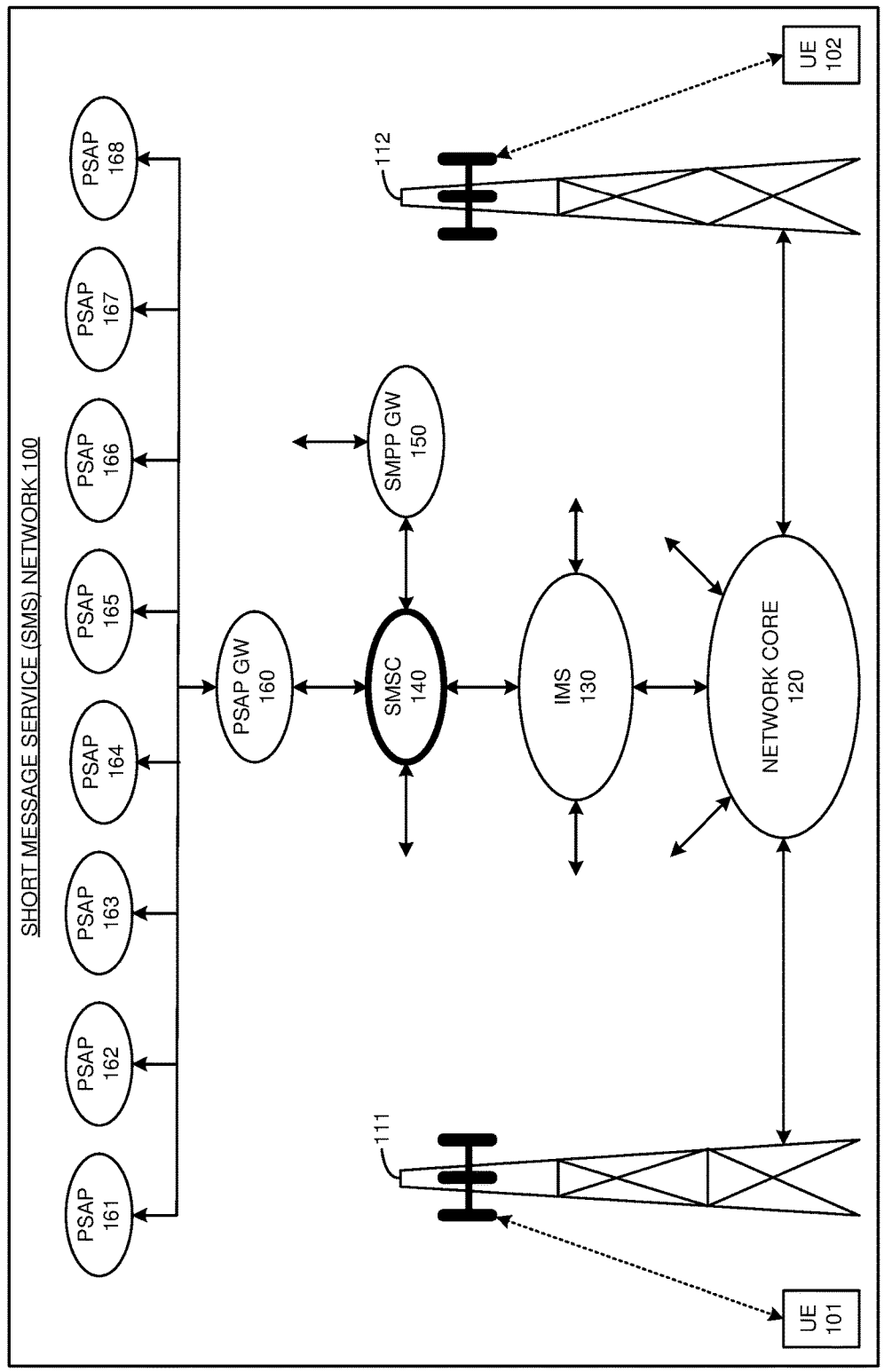
FIG. 1 illustrates a Short Message Service (SMS) network to support emergency SMS for User Equipment (UEs).

FIG. 1 illustrates Short Message Service (SMS) network 100 to support emergency SMS for User Equipment (UEs) 101-102. SMS network 100 comprises UEs 101-102, wireless access points 111-112, network core 120, Internet Multimedia Subsystem (IMS) 130, SMS Center (SMSC) 140, Short Message Peer-to-Peer (SMPP) Gateway (GW) 150, and Public Safety Answering Point (PSAP) GW 160. UE 101 is wirelessly attached to wireless access point 111. UE 102 is wirelessly attached to wireless access point 112. Wireless access points 111-112 are coupled to network core 120.

Network core 120 is coupled to Internet Multimedia Subsystem (IMS) 130 and to other access points and network cores (not shown). IMS 130 is coupled to SMSC 140 and to other IMSs (not shown). SMSC 140 is coupled to SMPP GW 150, PSAP GW 160, and to other SMPP GWs and SMSCs (not shown). PSAP GW 160 is coupled to PSAPs 161-168. PSAPs 161-168 are assigned to different geographic areas. Each of PSAPs 161-168 receives emergency SMS messages from UEs in their own assigned geographic areas. SMS network 100 typically has many more UEs and wireless access points, and the number shown has been restricted for clarity.

UEs 101-102 comprise phones, computers, vehicles, headsets, or some other user apparatus with wireless communication capability. UEs 101-102 each comprise a wireless transceiver and baseband circuitry. The wireless transceiver circuitry comprises antennas, modulators, amplifiers, filters, digital/analog interfaces, Digital Signal Processors (DSPs), memory circuitry, firmware/software, and bus circuitry. The wireless transceiver circuitry uses wireless network protocols like Fifth Generation New Radio (5GNR), Long Term Evolution (LTE), Institute of Electrical and Electronic Engineers 802.11 (WIFI), or some other wireless communication protocol. The baseband circuitry comprises processing circuitry, memory circuitry, software, bus circuitry, and perhaps additional transceiver circuitry. The processing circuitry comprises Central Processing Units (CPUs), Graphics Processing Units (GPUs), Application Specific Integrated Circuits (ASICs), Field Programmable Gate Arrays (FPGAs), and/or some other electronic circuitry. The memory circuitry comprises volatile and/or non-volatile data storage like Random Access Memory (RAM), cache memory, flash drives, disk drives and the like. The software includes an operating system, SMS application, and typically other user applications. The software also includes modules for Physical Layer (PHY), Media Access Control (MAC), Radio Link Control (RLC), Packet Data Convergence Protocol (PDCP), Radio Resource Control (RRC), Service Data Application Protocol (SDAP), and the like.

Wireless access points 111-112 each comprise wireless transceiver circuitry and baseband circuitry. The wireless transceiver circuitry comprises antennas, modulators, amplifiers, filters, digital/analog interfaces, DSPs, memory circuitry, firmware/software, and bus circuitry. The wireless transceiver circuitry uses wireless network protocols like 5GNR, LTE, and WIFI. The baseband circuitry comprises processing circuitry, memory circuitry, software, bus circuitry, and network transceiver circuitry. The processing circuitry comprises CPUs, GPUs, ASICs, and/or some other data electronics. The memory circuitry comprises volatile and non-volatile data storage like RAM, cache memory, flash drives, disk drives and the like. The software includes an operating system and modules for the PHY, MAC, RLC, PDCP, RRC, and SDAP. The network transceiver circuitry comprises amplifiers, filters, digital/analog interfaces, DSPs, memory circuitry, firmware/software, and bus circuitry. The network transceiver circuitry typically uses landline network protocols like IEEE 802.3 (Ethernet), Internet Protocol (IP), Data over Cable System Interface Specification (DOCSIS), Time Division Multiplex (TDM), Wave Division Multiplex (WDM), Synchronous Optical Network (SONET), and the like. The network transceiver circuitry may use wireless network protocols like WIFI, LTE, 5GNR, or another over-the-air format.

Network core 120 comprises network transceiver circuitry and computer circuitry. The network transceiver circuitry comprises amplifiers, filters, digital/analog interfaces, DSPs, memory circuitry, firmware/software, and bus circuitry. The network transceiver circuitry uses network protocols like Ethernet, IP, DOCSIS, TDM, WDM, SONET, 5GNR, LTE, and/or WIFI. The computer circuitry comprises processing circuitry, memory circuitry, software, bus circuitry, and network transceiver circuitry. The processing circuitry comprises CPUs, GPUs, ASICs, FPGAs, and/or some other electronic circuitry. The memory circuitry comprises volatile and/or non-volatile data storage like RAM, cache memory, flash drives, disk drives and the like. The software includes operating systems and modules for network elements like Access and Mobility Management Functions (AMF), Authentication Server Function (AUSF), Unified Data Management (UDM), Policy Control Function (PCF), Session Management Function (SMF), Application Function (AF), Mobility Management Entity (MME), Home Subscriber System (HSS), Serving Gateway (S-GW), Packet Data Network Gateway (P-GW), Policy Charging Rules Function (PCRF), and/or other networking modules. In some examples, network core 120 comprises Network Function Virtualization (NFV) hardware that hosts virtualization layers, Management and Orchestration (MANO), and Virtual Network Functions (VNFs). The VNFs implement AMF, AUSF, UDM, PCF, SMF, AF, MME, HSS, S-GW, P-GW, PCRF, and/or some other network elements.

IMS 130 comprises network transceiver circuitry and computer circuitry. The network transceiver circuitry comprises amplifiers, filters, digital/analog interfaces, DSPs, memory circuitry, firmware/software, and bus circuitry. The network transceiver circuitry uses network protocols like Ethernet, IP, DOCSIS, TDM, WDM, SONET, 5GNR, LTE, and/or WIFI. The computer circuitry comprises processing circuitry, memory circuitry, software, bus circuitry, and network transceiver circuitry. The processing circuitry comprises CPUs, GPUs, ASICs, FPGAs, and/or some other electronic circuitry. The memory circuitry comprises volatile and/or non-volatile data storage like RAM, cache memory, flash drives, disk drives and the like. The software includes operating systems and modules for network elements like HSS, Proxy Call State Control Function (P-CSCF), Serving Call State Control Function (S-CSCF), Interrogating Call State Control Function (I-CSCF), Session Initiation Protocol Application Servers (SIP AS), and/or other networking modules. In some IMS 130 comprises NFV hardware that hosts virtualization layers, MANO, and VNFs. The VNFs implement HSS, P-CSCF, S-CSCF, I-CSCF, SIP AS, and/or other networking modules. IMS 130 may be integrated into network core 120.

SMSC 140 comprises network transceiver circuitry and computer circuitry. The network transceiver circuitry comprises amplifiers, filters, digital/analog interfaces, DSPs, memory circuitry, firmware/software, and bus circuitry. The network transceiver circuitry uses network protocols like Ethernet, IP, DOCSIS, TDM, WDM, SONET, 5GNR, LTE, and/or WIFI. The computer circuitry comprises processing circuitry, memory circuitry, software, bus circuitry, and network transceiver circuitry. The processing circuitry comprises CPUs, GPUs, ASICs, FPGAs, and/or some other electronic circuitry. The memory circuitry comprises volatile and/or non-volatile data storage like RAM, cache memory, flash drives, disk drives and the like. The software includes operating systems and modules for network elements like SIP interface, message processing, SMPP interface, and/or other networking modules. In some examples, SMSC 140 comprises NFV hardware that hosts virtualization layers, MANO, and VNFs. The VNFs implement SIP interface, message processing, SMPP interface, and/or other networking modules. SMSC 140 may be integrated into network core 120 and/or IMS 130.

SMPP GW 150 comprises network transceiver circuitry and computer circuitry. The network transceiver circuitry comprises amplifiers, filters, digital/analog interfaces, DSPs, memory circuitry, firmware/software, and bus circuitry. The network transceiver circuitry uses network protocols like Ethernet, IP, DOCSIS, TDM, WDM, SONET, 5GNR, LTE, and/or WIFI. The computer circuitry comprises processing circuitry, memory circuitry, software, bus circuitry, and network transceiver circuitry. The processing circuitry comprises CPUs, GPUs, ASICs, FPGAs, and/or some other electronic circuitry. The memory circuitry comprises volatile and/or non-volatile data storage like RAM, cache memory, flash drives, disk drives and the like. The software includes operating systems and modules for network elements like SIP interface, message processing, SMPP interface, and/or other networking modules. In some examples, SMPP GW 150 comprises NFV hardware that hosts virtualization layers, MANO, and VNFs. The VNFs implement SIP interface, message processing, SMPP interface, and/or other networking modules. SMPP GW 150 may be integrated into network core 120, IMS 130, and/or SMSC 140.

PSAP GW 160 comprises network transceiver circuitry and computer circuitry. The network transceiver circuitry comprises amplifiers, filters, digital/analog interfaces, DSPs, memory circuitry, firmware/software, and bus circuitry. The network transceiver circuitry uses network protocols like Ethernet, IP, DOCSIS, TDM, WDM, SONET, 5GNR, LTE, and/or WIFI. The computer circuitry comprises processing circuitry, memory circuitry, software, bus circuitry, and network transceiver circuitry. The processing circuitry comprises CPUs, GPUs, ASICs, FPGAs, and/or some other electronic circuitry. The memory circuitry comprises volatile and/or non-volatile data storage like RAM, cache memory, flash drives, disk drives and the like. The software includes operating systems and modules for network elements like SMPP IF, PSAP AS, PSAP IF, and/or other networking modules. In some examples, PSAP GW 160 comprises NFV hardware that hosts virtualization layers, MANO, and VNFs. The VNFs implement SMPP IF, PSAP AS, PSAP IF, and/or other networking modules. PSAP GW 160 may be integrated into network core 120, IMS 130, SMSC 140, and/or SMPP GW 150.

In a non-emergency example, UE 101 generates an SMS message for transfer to UE 102. In response to the non-emergency SMS message, UE 101 generates a SIP message that has geographic data for UE 101 in a Private Network Access Information (PANI) header of the SIP message. The geographic data could be the identity of wireless access point 111, geographic coordinates for wireless access point 111, geographic coordinates for UE 101, a valid physical address for UE 101, or some other UE 101 location information. UE 101 transfers the SIP message to IMS 130 over wireless access point 111 and network core 120. Due to the SMS message indicator in the SIP message, IMS 130 forwards the SIP message containing the SMS message to SMSC 140.

SMSC 140 receives the SIP message containing the SMS message for UE 102 and the geographic data for UE 101. SMSC 140 extracts the geographic data for UE 101 from the PANI header of the SIP message. SMSC 140 stores the geographic data in association with UE 101. UE 101 may be identified by network address, origination code, subscriber number, equipment number, and/or some other identifying data.

SMSC 140 extracts the SMS message from the SIP message and extracts the destination code from the SMS message. SMSC 140 determines if the destination code from the SMS message indicates an emergency SMS message. The destination code for UE 102 does not qualify the SMS message as an emergency SMS message. When the destination code does not indicate an emergency SMS message, SMSC 140 authenticates and authorizes UE 101 to send the SMS message to UE 102—typically through an authorization database. Once UE 101 is authenticated and authorized for SMS, SMSC 140 routes the SMS message based on the destination code for UE 102. Based on the routing, SMSC 140 transfers a SIP message having the SMS message to IMS 130. IMS 130 generates a SIP message for UE 102 and transfers the SIP message containing the SMS message to UE 102 over network core 120 and wireless access point 112. UE 102 receives the SIP message and extracts the SMS message. UE 102 presents the SMS message and/or performs another SMS-initiated task.

In an emergency example, UE 101 generates an emergency SMS message that has an emergency destination code like "911" or "emergency". In response to the emergency SIP message, UE 101 generates a SIP message that has geographic data for UE 101 in the PANI header. The geographic data could be the identity of wireless access point 111, geographic coordinates for wireless access point 111, geographic coordinates for UE 101, a valid physical address for UE 101, or some other UE 101 location information. UE 101 transfers the SIP message to IMS 130 over wireless access point 111 and network core 120. Due to the SMS message indicator, IMS 130 forwards the SIP message containing the emergency to SMSC 140.

SMSC 140 receives the SIP message that has the emergency SMS message and the geographic data for UE 101. SMSC 140 extracts the geographic data for UE 101 from the PANI header in the SIP message. SMSC 140 stores the geographic data in association with UE 101. UE 101 may be identified by network address, origination code, subscriber number, equipment number, and/or some other identifying data.

SMSC 140 extracts the emergency SMS message from the SIP message and extracts the destination code from the emergency SMS message. SMSC 140 determines if the destination code from the emergency SMS message is an emergency destination code. An emergency destination code like "911" qualifies the SMS message as an emergency SMS message. When the destination code indicates an emergency SMS message, SMSC 140 generates an emergency Short Message Peer-to-Peer (SMPP) message that has the stored geographic data for UE 101 in a Type-Length-Value (TLV). SMSC 140 transfers the emergency SMPP message containing the emergency SMS message and the geographic data TLV to PSAP GW 160. Advantageously, SMSC 140 transfers the geographic data for UE 101 from the SIP PANI header to the SMPP TLV.

PSAP GW 160 receives the emergency SMPP message that has geographic data TLV and the emergency SMS message. PSAP GW 160 extracts the geographic data for UE 101 from TLV in the SMPP message. PSAP GW 160 selects one of PSAPs 161-168 based on the geographic data for UE 101. Typically, PSAP GW 160 selects a PSAP that serves the geographic area which includes UE 101 as indicated by the geographic data. PSAP gateway 160 transfers the emergency SMS information and the geographic data for UE 101 to the selected one of PSAPs 161-168. The selected one of PSAPs 161-168 then responds to the emergency based on the geographic location of UE 101.

In some examples, SMSC 140 enhances the geographic information before transfer to PSAP GW 160. For example, SMSC 160 may translate the wireless access point 111 identifier into geographic coordinates for wireless access point 111. SMSC 140 then adds the geographic coordinates to the SMPP message in another TLV or replaces the wireless access point identifier in the TLV.

In some examples, SMSC 140 adds the geographic information for UE 101 from the SIP PANI header to some non-emergency SMPP messages. In these examples, UE 101 generates a non-emergency SMS message, and in response, UE 101 generates a SIP message that has geographic data for UE 101 in the PANI header. UE 101 transfers the SIP message to SMSC 140 over wireless access point 111, network core 120, and IMS 130. SMSC 140 receives the SIP message that has the SMS message and the geographic data for UE 101. SMSC 140 stores the geographic data for UE 101. SMSC 140 extracts the SMS message from the PANI header in the SIP message and extracts the destination code from the SMS message. Since the destination code is not an emergency code, SMSC 140 authenticates and authorizes UE 101 to send the SMS message to the destination code. SMSC 140 also authorizes the transfer of the geographic data for UE 101 along with the SMS message. Once UE 101 is authenticated and authorized, SMSC 140 generates an SMPP message that has the stored geographic data for UE 101 in a TLV. SMSC 140 transfers the SMPP message containing the SMS message and the geographic data for UE 101 to SMPP gateway 150. SMPP gateway 150 may use the geographic data to provide various location services responsive to the SMS message from UE 101. SMPP GW 150 may transfer the SMS message and the geographic data for UE 101 for delivery to the destination code. SMPP GW 150 may transfer another SMPP message having the geographic data for UE 101 in a TLV and having the SMS message for delivery to the destination code. The destination may use the geographic data to provide various location services responsive to the SMS message from UE 101.

Figure 2:
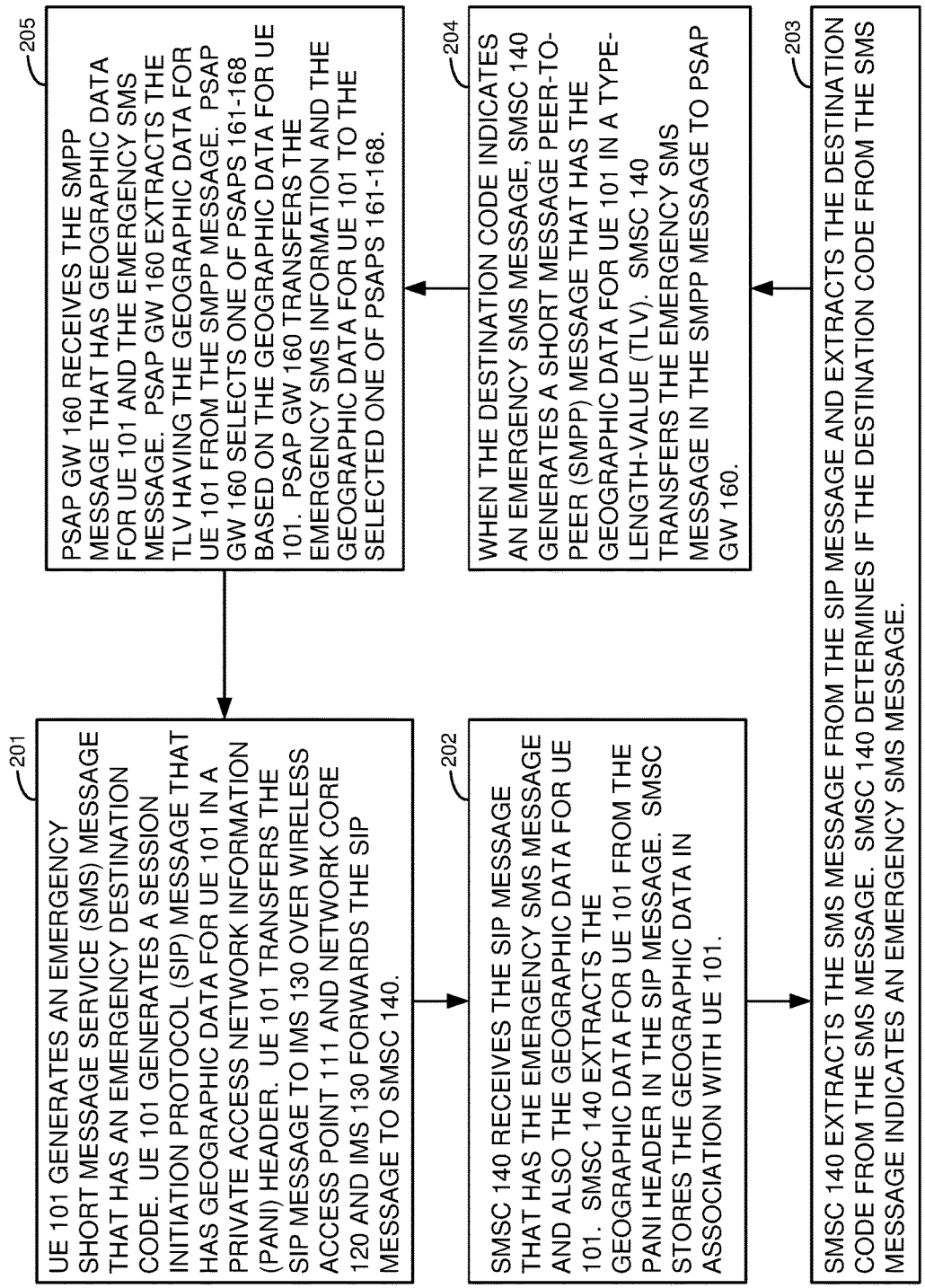
FIG. 2 illustrates the operation of the SMS network to support the emergency SMS for the UEs.

FIG. 2 illustrates the operation of SMS network 100 to support the emergency SMS for the UE 101. UE 101 generates an emergency SMS message that has an emergency destination code like 911 (201). In response, UE 101 generates a SIP message that has geographic data for UE 101 in a PANI header. The geographic data could be the identity of wireless access point 111, geographic coordinates for wireless access point 111, geographic coordinates for UE 101, a valid physical address for UE 101, or some other UE 101 location information. UE 101 transfers the SIP message to IMS 130 over wireless access point 111 and network core 120. Due to the presence of the SMS message, IMS 130 forwards the SIP message to SMSC 140.

SMSC 140 receives the SIP message that has the emergency SMS message and also the geographic data for UE 101 (202). SMSC 140 extracts the geographic data for UE 101 from the PANI header in the SIP message. SMSC 140 stores the geographic data in association with UE 101. UE 101 may be identified by network address, origination code, subscriber number, equipment number, and/or some other identifying data. SMSC 140 extracts the SMS message from the SIP message and extracts the destination code from the SMS message (203). SMSC 140 determines if the destination code from the SMS message indicates an emergency SMS message, and the emergency destination code like 911 qualifies the message as an emergency SMS message. When the destination code indicates an emergency SMS message, SMSC 140 generates an SMPP message that has the stored geographic data for UE 101 in a Type-Length-Value (TLV) (204). SMSC 140 transfers the emergency SMS message in the SMPP message to PSAP GW 160.

PSAP GW 160 receives the SMPP message that has geographic data for UE 101 and the emergency SMS message (205). PSAP GW 160 extracts the TLV having the geographic data for UE 101 from the SMPP message. PSAP GW 160 selects one of PSAPs 161-168 based on the geographic data for UE 101. Typically, the PSAP is selected that is assigned to the geographic area which includes UE 101. PSAP gateway 150 transfers the emergency SMS information and the geographic data for UE 101 to the selected one of PSAPs 161-168. The selected one of PSAPs 161-168 then responds to the emergency based on the location of UE 101.

Figure 3:
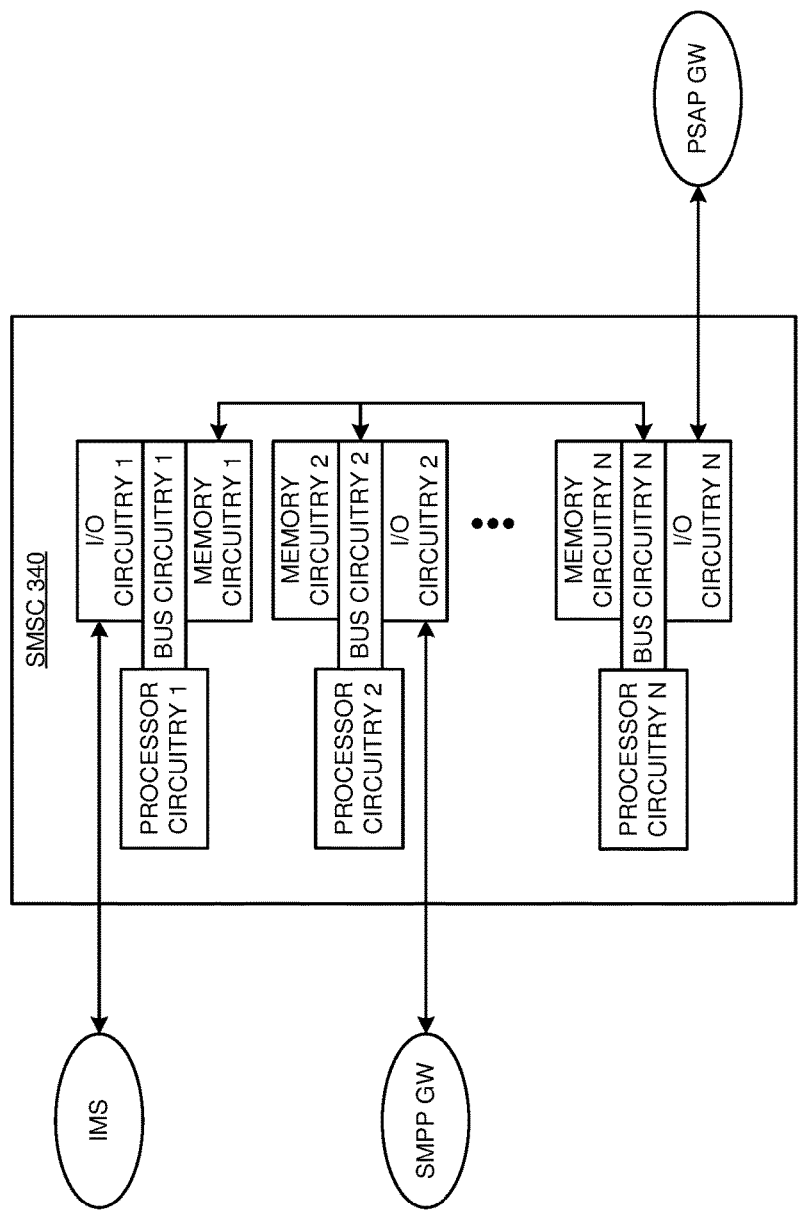
FIG. 3 illustrates a hardware architecture for a SMSC to support emergency SMS for UEs.

FIG. 3 illustrates a hardware architecture for SMSC 340 to support emergency SMS for UEs. The hardware architecture is exemplary and other hardware architectures could be used. SMSC 340 comprises processor circuitry 1-N, memory circuitry 1-N, I/O circuitry 1-N, and bus circuitry 1-N. Bus circuitry 1-N is coupled together. Bus circuitry 1 couples radio circuitry 1, memory circuitry 1, and I/O circuitry 1, and bus circuitry 2-N, radio circuitry 2-N, memory circuitry 2-N, and I/O circuitry 2-N are coupled in a similar manner. I/O circuitry 1 is linked to an IMS and I/O circuitry N is linked to PSAP GW 160. I/O circuitry 1-N and bus circuitry 1-N comprise amplifiers, filters, digital/analog interfaces, DSPs, memory circuitry, firmware/software, and signal links. The I/O circuitry uses network protocols like Ethernet, IP, DOCSIS, TDM, WDM, SONET, 5GNR, LTE, and/or WIFI. The processing circuitry comprises CPUs, GPUs, ASICs, FPGAs, and/or some other electronic circuitry. The memory circuitry comprises volatile and/or non-volatile data storage like RAM, cache memory, flash drives, disk drives and the like. The software includes operating systems and modules for network elements like SIP interface, message processing, SMPP gateway, and/or other networking modules.

I/O circuitry 1 receives SIP messages that have SMS messages and geographic data for UEs from an IMS. Processor circuitry 1 extracts the geographic data for the UEs from the PANI headers in the SIP message and stores the geographic data in individual association with the UEs in memory circuitry 1. The UEs are identified by SMS origination code and possibly some other information. Processor circuitry 1 extracts the SMS messages from the SIP messages and extracts the destination codes from the SMS messages.

Processor circuitry 1 determines if the destination codes from the SMS messages indicate any emergency SMS messages. If a destination code (like "911" or "emergency") qualifies an SMS message as an emergency message, then processor circuitry 1 transfers the geographic data and emergency SMS message to memory circuitry N and signals processor circuitry N to transfer an SMPP message that has the geographic data and the emergency SMS message for the UE.

Processor circuitry N generates an SMPP message that has the geographic data for the UE in a TLV and that has the emergency SMS message. Processor circuitry N transfers the SMPP message over I/O circuitry N to a PSAP GW for PSAP selection based on the geographic TLV. If the destination code does not qualify an SMS message as an emergency message, then processor circuitry 1 transfers the geographic data and SMS message to memory circuitry 2 and signals processor circuitry 2 to authorize UE. Processor circuitry 2 authenticates and authorizes the UE to transfer the SMS message and also authorizes the transfer of geographic data for the UE along with the SMS message. Processor circuitry 2 generates an SMPP message that has the geographic data for the UE in a TLV and that has the SMS message. Processor circuitry 2 transfers the SMPP message over I/O circuitry 2 to an SMPP GW for delivery and possibly other actions based on the geographic data for UE 101.

Figure 4:
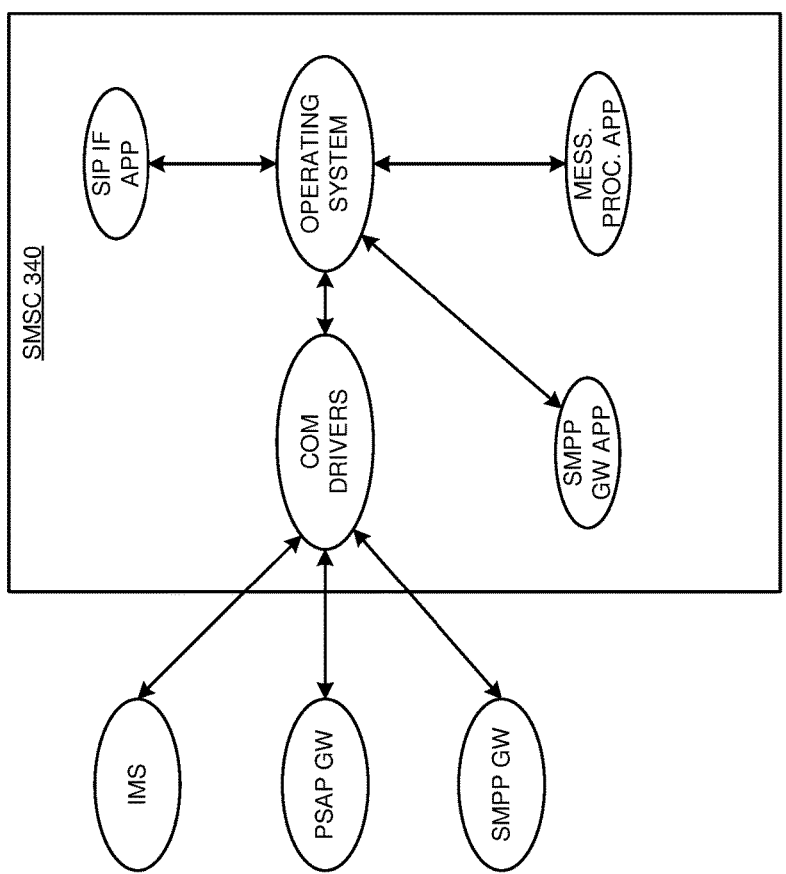
FIG. 4 illustrates a software architecture for the SMSC to support emergency SMS for UEs.

FIG. 4 illustrates a software architecture for SMSC 340 to support emergency SMS for UEs. The software architecture is exemplary and other software architectures could be used. SMSC 340 comprises a communication drivers, operating system, and network applications for SIP interface, message processing, and SMPP interface. The communication drivers receive SIP messages that contain SMS messages and geographic data for UEs from an IMS and interrupt the operating system which invokes the SIP IF application. The SIP IF application extracts the geographic data for the UEs from the PANI headers in the SIP messages. The SIP IF application stores the geographic data in individual association with the UEs. The UEs are identified by their SMS origination code and possibly some other information. The SIP IF application extracts the SMS messages from the SIP messages and stores the SMS messages for the message processing (mess. proc.) application.

The message processing application extracts the destination codes from the SMS messages. The message processing application determines if the destination codes from the SMS messages indicate any emergency SMS messages. If a destination code (like "911" or "emergency") qualifies an SMS message as an emergency message, then the message processing application signals the SMPP IF application to transfer an SMPP message that has the geographic data and the emergency SMS message for the UE. The SMPP IF application generates an SMPP message that has the geographic data for the UE in a TLV and that has the emergency SMS message. The SMPP IF application requests the operating system to direct the communication drivers to transfer the SMPP message to a PSAP GW for PSAP selection based on the geographic TLV.

In some examples, the SIP IF application enhances the geographic information before transfer to the PSAP GWs. For example, the SIP IF application may translate the wireless access point identifiers into proximate geographic coordinates for the UEs. The SMPP IF application adds the geographic coordinates for the UEs to the SMPP messages in TLVs.

In some examples, SMSC 340 adds the geographic information for the UEs to non-emergency SMPP messages. In these examples, the message processing application authorizes location-assisted SMS for the UE to the destination. In response to the authorization, the message processing application directs the SMPP IF application to transfer an SMPP message that has the stored geographic data for the UE in a TLV. The SMPP IF application transfers the SMPP message having the SMS message to an SMPP gateway for transfer to the destination. The SMPP GW and/or the destination may use the geographic data for the UE to provide location-based services responsive to the SMS message.

Figure 5:
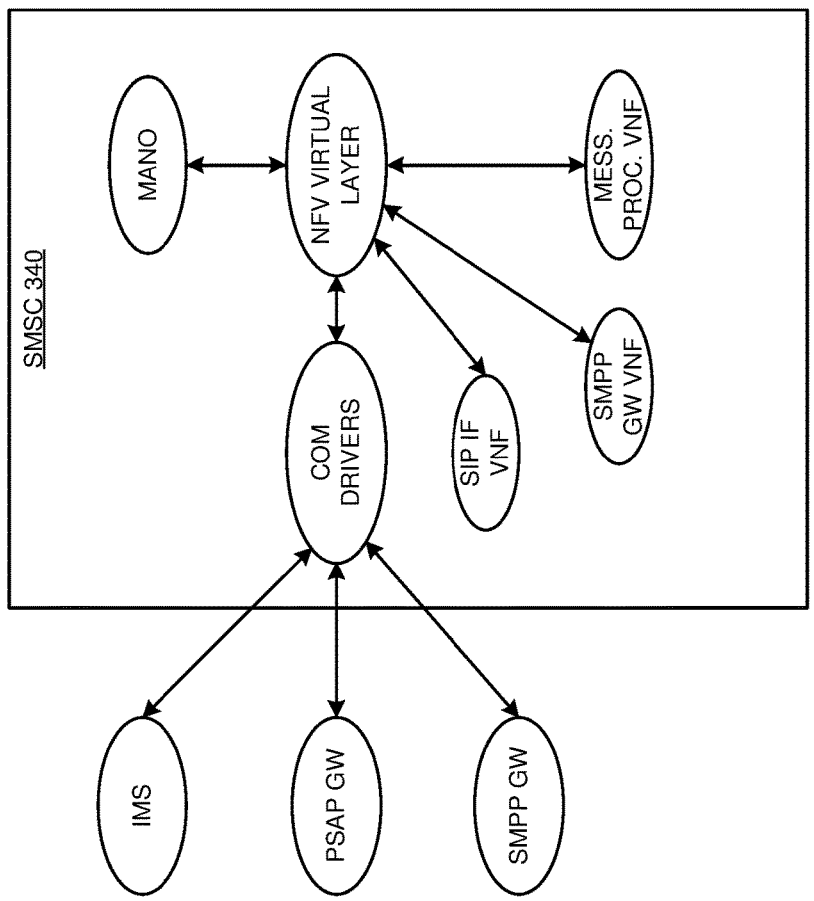
FIG. 5 illustrates another software architecture for the SMSC to support emergency SMS for UEs.

FIG. 5 illustrates another software architecture for SMSC 340 to support emergency SMS for UEs. The software architecture is exemplary and other software architectures could be used. In this example, SMSC 340 comprises communication drivers, NFV virtualization layers, MANO, and VNFs. The NFV virtual layer comprises operating systems, hypervisors, virtual machines, vSWs, and perhaps other virtualization modules. The MANO comprises Operational Support Systems (OSS), orchestrators, VNF Managers (VNFMs), Virtual Infrastructure Managers (VIMs), and the like. The VNFs implement SIP IF, message processing, SMPP IF, and/or other networking modules. SMSC 340 may be integrated into a network core and/or an IMS. In an NFV, the MANO gets a Network Service Descriptor (NSD) from the OSS that details the VNFs, Virtual Links (VLs), Physical Network Functions (PNFs), PNF Forwarding Graphs (PNFFGs), and VNF Forwarding Graphs (VNFFGs) for SMSC 340.

The communication drivers receive SIP messages that have SMS messages and geographic data for UEs from an IMS and interrupt the NFV virtual layer which invokes the SIP IF VNF. The SIP IF VNF extracts the geographic data for the UEs from the PANI headers in the SIP messages. The SIP IF VNF stores the geographic data in individual association with the UEs. The SIP IF VNF extracts the SMS messages from the SIP messages and stores the SMS messages for the message processing VNF. The message processing VNF extracts the destination codes from the SMS messages. The message processing VNF determines if the destination codes from the SMS messages indicate any emergency SMS messages. For emergency SMS messages, the message processing VNF signals the SMPP IF VNF to transfer an SMPP message to the PSAP GW that has the geographic data and the emergency SMS message for the UE. The SMPP IF VNF generates the SMPP message that has the geographic data for the UE in a TLV and that has the emergency SMS message. The SMPP GW VNF requests the virtual layer to direct the communication drivers to transfer the SMPP message to a PSAP GW for PSAP selection based on the geographic TLV. In some examples, the SIP IF VNF enhances the geographic information. In some examples, the message processing VNF authorizes the transfer of the geographic information for the UEs along with the SMS messages in non-emergency situations.

Figure 6:
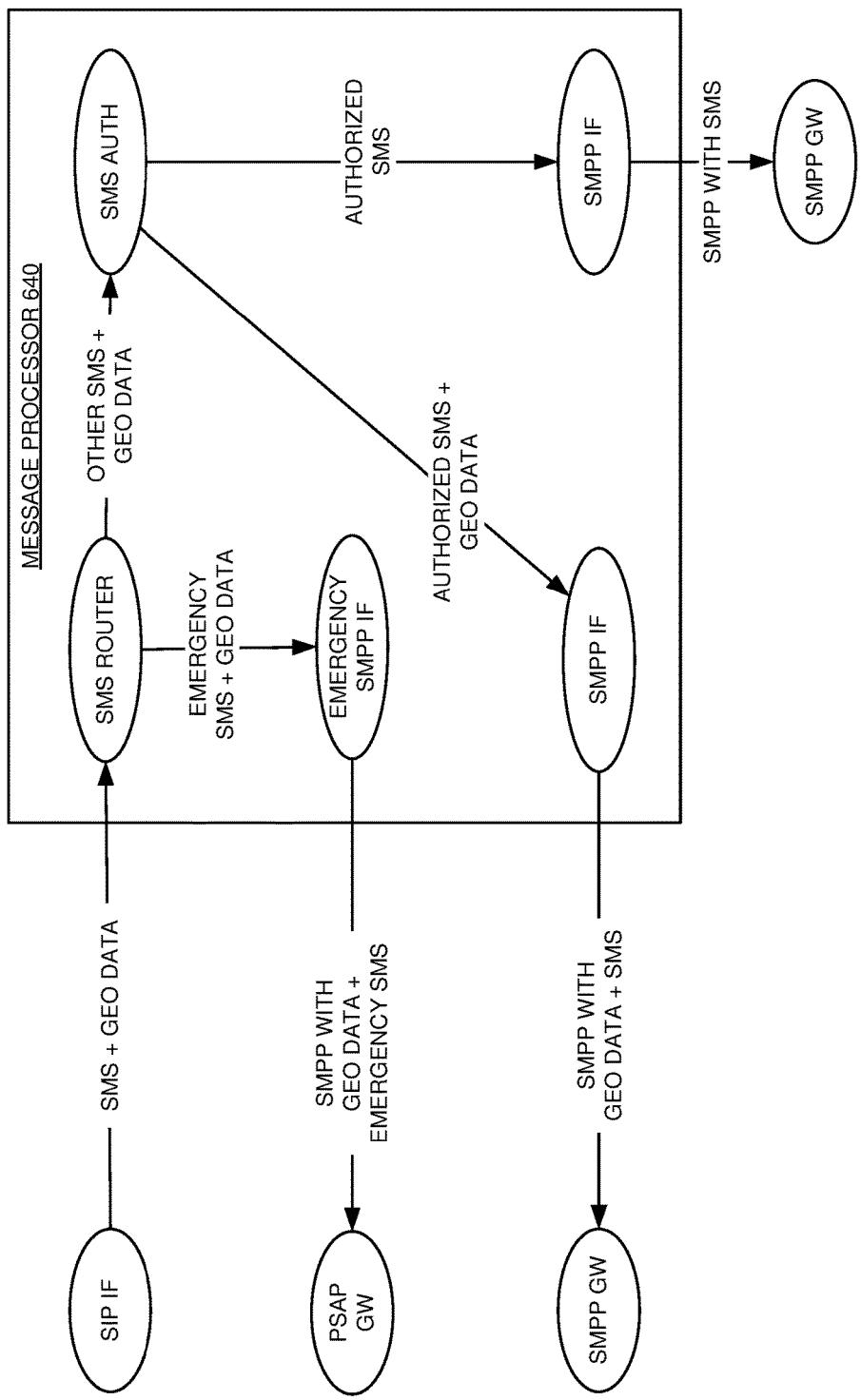
FIG. 6 illustrates a message processor in an SMSC to support emergency SMS for UEs.

FIG. 6 illustrates message processor 640 in an SMSC to support emergency SMS for UEs. Message processor 640 is exemplary and other SMSC processors could be used. The SIP IF extracts geographic data and SMS messages from SIP messages. The SIP IF transfers geographic data and SMS messages to an SMS router in message processor 640. The SMS router determines if the destination code from the SMS message indicates an emergency SMS message. When the destination code indicates an emergency SMS message, the SMS router transfers the emergency SMS message and its corresponding geographic data to an emergency SMPP IF. The emergency SMPP IF generates an emergency SMPP message that has the geographic data for the UE in a Type-Length-Value (TLV) and that also has the emergency SMS message. The emergency SMPP IF transfers the SMPP message that has the geographic data and the emergency SMS message for the UE to a PSAP GW (which is also an SMPP GW). The PSAP GW selects a PSAP for the UE based on the geographic data in the TLV and transfers the emergency SMS data and geographic data to the selected PSAP.

When the destination code does not indicate an emergency SMS message, the SMS router transfers the SMS message its corresponding geographic data to an SMS authorization server. The SMS authorization server authorizes the transfer of the SMS message based on the origination code and possibly the destination code. During authorization, the SMS authorization server may also authorize UE location-assistance for some SMS messages based on the origination code and possibly the destination code. When authorization indicates a UE location-assisted SMS message, the SMS router transfers the SMS message and its corresponding geographic data to an SMPP IF. The SMPP IF generates a SMPP message that has the geographic data in a TLV and that also has the SMS message. The SMPP IF transfers the SMPP message that has the geographic data and the SMS message for the UE to an SMPP GW for location-assisted SMS delivery. When the authorization does not indicate a UE location-assisted SMS message, the SMS router transfers the SMS message without its corresponding geographic data to an SMPP IF. The SMPP IF generates and transfers a SMPP message that has the SMS message but not any corresponding geographic data.

The data network circuitry described above comprises computer hardware and software that form a special-purpose machine—SMSC circuitry that transfers geographic information for UEs along with SMS messages. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuity and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose SMSC circuitry that transfers geographic information for UEs along with SMS messages.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Short Message Service Center (SMSC) to support an emergency Short Message Service (SMS) for User Equipment (UE), the method comprising:
    the SMSC receiving a Session Initiation Protocol (SIP) message transferred by the UE, wherein the SIP message has a Private Access Network Information (PANI) header with geographic data for the UE, and wherein the SIP message has a Short Message Service (SMS) message with a destination code;
    the SMSC storing the geographic data for the UE from the PANI header in association with the UE;
    the SMSC determining when the destination code from the SMS message indicates an emergency SMS message;
    when the destination code indicates the emergency SMS message, the SMSC transferring an emergency Short Message Peer-to-Peer (SMPP) message for delivery to a Public Safety Answering Point (PSAP) gateway, wherein the emergency SMPP message has the geographic data for the UE and the emergency SMS message, and wherein the PSAP gateway selects a PSAP for the UE based on the geographic data in the SMPP message and transfers emergency SMS message data and the geographic data to the selected PSAP;
    the SMSC receiving another SIP message transferred by the UE, wherein the other SIP message has another PANI header with other geographic data for the UE, and wherein the other SIP message has another SMS message with another destination code;
    the SMSC storing the other geographic data for the UE from the other PANI header in association with the UE;
    the SMSC determining when the other destination code from the other SMS message indicates a UE location-assisted SMS message; and
    when the other destination code indicates the UE location-assisted SMS message, the SMSC transferring a location-assisted SMPP message for delivery to the SMPP gateway, wherein the location-assisted SMPP message has the other geographic data for the UE and the other SMS message.

2. The method of claim 1 wherein the emergency SMPP message has the geographic data for the UE in a Type Length Value.

3. The method of claim 1 wherein the geographic data comprises a wireless access point identifier for a wireless access point that serves the UE.

4. The method of claim 1 wherein the geographic data comprises geographic coordinates for the UE.

5. The method of claim 1 further comprising the SMSC determining geographic coordinates for a wireless access point that serves the UE based on the geographic data in the PANI header of the SIP message and wherein the geographic data in the emergency SMPP message comprises the geographic coordinates.

6. The method of claim 1 wherein the other geographic data comprises a wireless access point identifier for a wireless access point that serves the UE.

7. The method of claim 1 wherein the other geographic data comprises geographic coordinates for the UE.

8. The method of claim 1 further comprising the SMSC determining geographic coordinates for a wireless access point that serves the UE based on the other geographic data in the other PANI header and wherein the other geographic data in the location-assisted SMPP message comprises the geographic coordinates for the wireless access point that serves the UE.

9. The method of claim 1 wherein the other destination code comprises a non-emergency destination code.

10. A Short Message Service Center (SMSC) to support an emergency Short Message Service (SMS) for User Equipment (UE), the SMSC comprising:
    Session Initiation Protocol (SIP) interface circuitry configured to receive a SIP message that has a Short Message Service (SMS) message that was transferred by the UE and store geographic data for the UE from a Private Access Network Information (PANI) header in the SIP message;
    message processing circuitry configured to determine when a destination code from the SMS message indicates an emergency SMS message;
    Short Message Peer-to-Peer (SMPP) interface circuitry configured, when the destination code indicates the emergency SMS message, to transfer an emergency SMPP message that has the geographic data for the UE and the emergency SMS message for delivery to a Public Safety Answering Point (PSAP) gateway that selects a PSAP for the UE based on the geographic data in the emergency SMPP message and transfers emergency SMS message data and the geographic data to the selected PSAP;
    the SIP interface circuitry configured to receive another SIP message transferred by the UE having other geographic data for the UE in another PANI header and that has another SMS message from the UE and to store the other geographic data for the UE from the other PANI header in association with the UE; and the message processing circuitry configured to determine when the other destination code from the other SMS message indicates a location-assisted SMS message;

the SMPP interface circuitry configured, when the other destination code indicates the location-assisted SMS message, to transfer a location-assisted SMPP message for delivery to an SMPP gateway, wherein the location-assisted SMPP message has the other geographic data for the UE and the other SMS message.

11. The SMSC of claim 10 wherein the emergency SMPP message has the geographic data for the UE in a Type Length Value.

12. The SMSC of claim 10 wherein the geographic data comprises a wireless access point identifier for a wireless access point that serves the UE.

13. The SMSC of claim 10 wherein the geographic data comprises geographic coordinates for the UE.

14. The SMSC of claim 10 further comprising the SIP interface circuitry configured to determine geographic coordinates for a wireless access point that serves the UE based on the geographic data in the PANI header of the SIP message and wherein the geographic data in the emergency SMPP message comprises the geographic coordinates.

15. The SMSC of claim 10 wherein the other geographic data comprises a wireless access point identifier for a wireless access point that serves the UE.

16. The SMSC of claim 10 wherein the other geographic data comprises geographic coordinates for the UE.

17. The SMSC of claim 10 further comprising the SIP interface circuitry configured to determine geographic coordinates for a wireless access point that serves the UE based on the other geographic data in the other PANI header and wherein the other geographic data in the location-assisted SMPP message comprises the geographic coordinates for the wireless access point that serves the UE.

18. The SMSC of claim 10 wherein the other destination code comprises a non-emergency destination code.

* * * * *